United States Patent
Dwarakanathan et al.

(10) Patent No.: US 11,943,144 B1
(45) Date of Patent: Mar. 26, 2024

(54) DYNAMIC TRAFFIC MANAGEMENT OF MICROSERVICES

(71) Applicant: Amazon Technologies, Inc., Seattle, WA (US)

(72) Inventors: Srinivasan Dwarakanathan, Austin, TX (US); Michael Ariaga, Pflugerville, TX (US); Chaitanya Kumar Peravalli, Austin, TX (US); Shashindra Kumar Shrivastav, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/696,193

(22) Filed: Mar. 16, 2022

(51) Int. Cl.
*H04L 47/2408* (2022.01)
*H04L 41/147* (2022.01)
*H04L 41/16* (2022.01)
*H04L 47/10* (2022.01)

(52) U.S. Cl.
CPC ........ *H04L 47/2408* (2013.01); *H04L 41/147* (2013.01); *H04L 41/16* (2013.01); *H04L 47/10* (2013.01)

(58) Field of Classification Search
CPC .................. H04L 47/2408; H04L 41/147
See application file for complete search history.

(56) References Cited

U.S. PATENT DOCUMENTS

| | | | | |
|---|---|---|---|---|
| 2017/0111233 | A1* | 4/2017 | Kokkula | H04L 41/0823 |
| 2018/0287903 | A1* | 10/2018 | Joshi | H04L 43/062 |
| 2018/0295588 | A1* | 10/2018 | Abdelmonem | H04B 17/345 |
| 2018/0309636 | A1* | 10/2018 | Strom | H04L 47/12 |
| 2019/0319881 | A1* | 10/2019 | Maskara | H04L 41/147 |

\* cited by examiner

*Primary Examiner* — John A Follansbee
*Assistant Examiner* — Fadi Haj Said
(74) *Attorney, Agent, or Firm* — Athorus, PLLC

(57) ABSTRACT

Described are systems and methods for providing dynamic, adaptive, real-time traffic rules for applications employing a microservice architecture. Embodiments of the present disclosure can utilize historical and real-time traffic information, as well as real-time computing resource information, to determine flow and retry rules that are to be enforced for one or more services associated with an application. The flow and retry rules can be continuously and iteratively updated based on changing real-time traffic and computing conditions. Advantageously, embodiments of the present disclosure can mitigate failures encountered by client devices in response to application programming interfaces (API) calls to the various services.

17 Claims, 9 Drawing Sheets

DYNAMIC TRAFFIC MANAGEMENT OF MICROSERVICES

BACKGROUND

Many applications are structured using a microservice architecture. Applications developed employing a microservice architecture typically employ a collection of connected, independent services which may communicate via application programming interfaces (API). Utilizing microservices in software development can provide many advantages. For example, microservices can facilitate efficient development, deployment, scaling, upgrades, etc. in the software development cycle. Accordingly, the various services utilized in the implementation of an application may have one or more upstream dependencies on other services. As services initiate calls to upstream services, the traffic flow to the upstream service, typically measured as transactions per second (TPS), may be controlled based on static configurations configured to control the traffic flow and retry logic to upstream services. Accordingly, in situations where the static traffic flow configuration (e.g., TPS) is exceeded, the traffic may be throttled even if the upstream services are able to handle the excess traffic (TPS). Further, the static nature of the configurations may include retry logic that may prompt retries at inopportune times (e.g., when upstream services are overloaded, etc.). Accordingly, current systems may not efficiently control traffic flow and/or retry in view of real-time traffic conditions being experienced by the services.

DETAILED DESCRIPTION

Figure 1A:
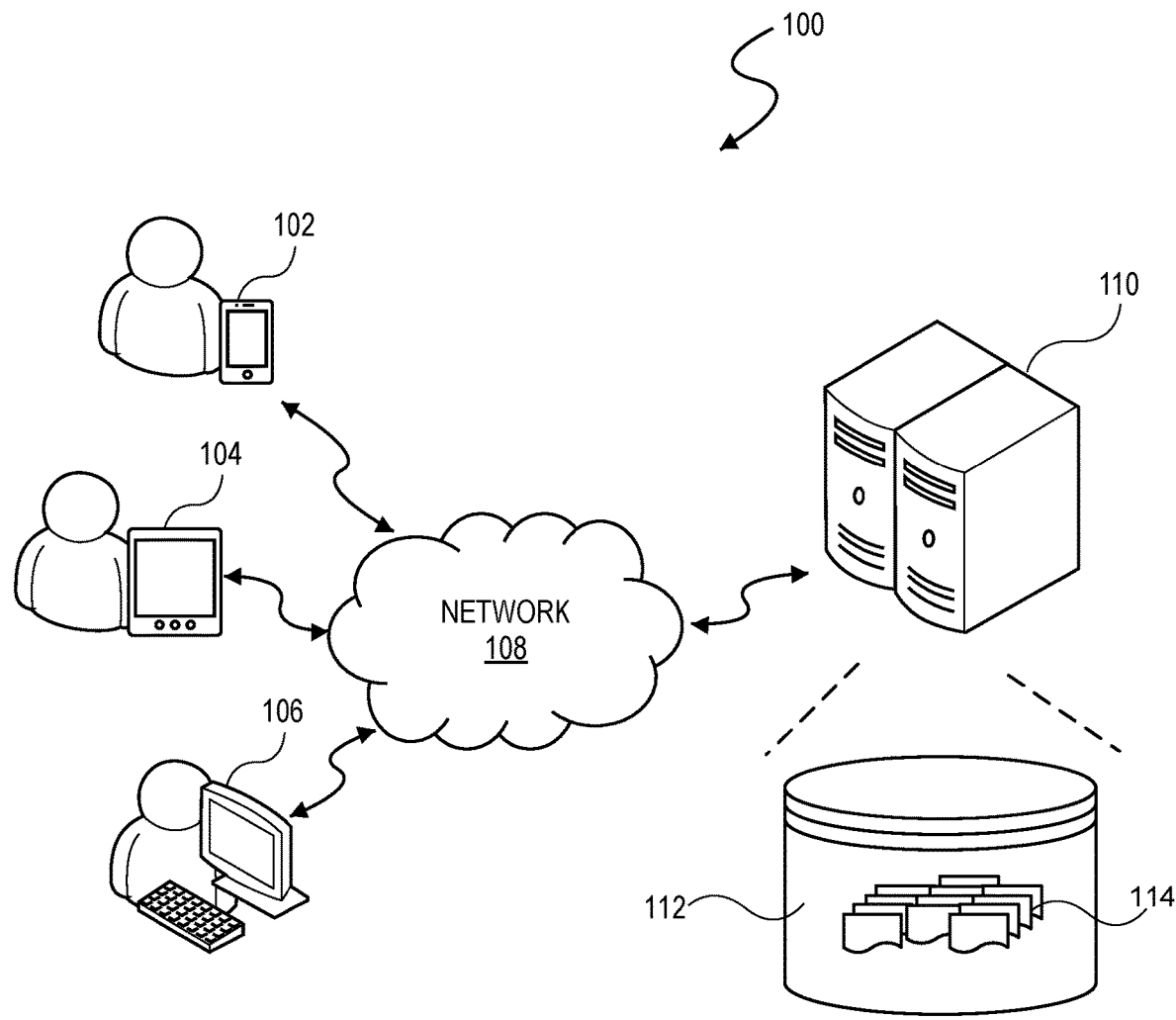
FIG. 1A is an illustration of an exemplary computing environment, according to exemplary embodiments of the present disclosure.

As is set forth in greater detail below, embodiments of the present disclosure are generally directed to systems and methods for providing dynamic, adaptive, real-time traffic rules for applications employing a microservice architecture. Embodiments of the present disclosure can utilize historical and real-time traffic information, as well as real-time computing resource information, to determine flow and retry rules that are to be enforced for one or more services associated with an application. The flow and retry rules can be continuously and iteratively updated based on changing real-time traffic and computing conditions. Advantageously, embodiments of the present disclosure can mitigate failures encountered by client devices in response to application programming interfaces (API) calls to the various services.

According to exemplary embodiments of the present disclosure, one or more machine learning models may be trained to determine flow and retry rules to be enforced for one or more services associated with an application. For example, the trained machine learning model may determine a historical traffic prediction based on historical traffic information accessed from a historical traffic data store. Alternatively, a historical traffic prediction for a certain time period (e.g., specific date, week, holiday, etc.) may be generated and stored and maintained in a historical traffic prediction datastore. The historical traffic information for the relevant time period and real-time traffic information, as well as real-time computing information, may be provided as inputs to the trained machine learning model to generate a traffic prediction, which may be used to generate flow and retry rules for one or more services. Accordingly, the real-time traffic and computing information may be continuously monitored and provided to the trained machine learning system such that the flow and retry rules can be continuously and dynamically updated based on the real-time traffic and computing information.

According to one aspect of the present disclosure, embodiments of the present disclosure may be implemented on the networking layer, where a controller may communicate with virtual network elements associated with each of the various services employed in a microservices architecture to obtain real-time traffic and computing information associated with each of the services. The real-time traffic and computing information, as well as historical traffic prediction information, may be provided to one or more trained machine learning models to determine a traffic prediction. The controller may, based on the traffic prediction generated by the trained machine learning model, determine flow and retry rules for each of the various services, and may communicate with the virtual network elements to enforce the flow and retry rules for the various services.

According to another aspect of the present disclosure, embodiments of the present disclosure may be implemented on the application layer, where a controller may communicate with an agent associated with each of the various services employed in a microservices architecture to obtain real-time traffic and computing information associated with each of the services. The real-time traffic and computing information, as well as historical traffic prediction information, may be provided to one or more trained machine learning models to determine a traffic prediction. The controller may, based on the traffic prediction generated by the trained machine learning model, determine flow and retry rules for each of the various services, and may communicate with the agents to enforce the flow and retry rules for the various services.

According to yet another aspect of the present disclosure, embodiments of the present disclosure may be implemented on the application layer with a cache memory. In such an exemplary implementation, each of the various services employed in a microservices architecture may communicate with the cache to log real-time traffic and computing information, as well as pull flow and retry rules for each of the services. Further, a controller may communicate with the cache to obtain real-time traffic and computing information associated with each of the services. The real-time traffic and computing information, as well as historical traffic prediction information, may be provided to one or more trained machine learning models to determine a traffic prediction. The controller may, based on the traffic prediction generated by the trained machine learning model, determine flow and retry rules for each of the various services, and may communicate with the cache to enforce the flow and retry rules.

According to yet another aspect of the present disclosure, embodiments of the present disclosure may be implemented on the application layer, where a controller may communicate with a cache memory and with an agent associated with each of the various services employed in a microservices architecture. In such an exemplary implementation, the controller may obtain real-time traffic and computing information associated with each of the services from either the agents associated with each of the various services or the cache memory. The real-time traffic and computing information, as well as historical traffic prediction information, may be provided to one or more trained machine learning models to determine a traffic prediction. The controller may, based on the traffic prediction generated by the trained machine learning model, determine flow and retry rules for each of the various services, and may communicate with either the agents associated with each of the various services or the cache memory to enforce the flow and retry rules.

According to yet another aspect of the present disclosure, embodiments of the present disclosure may be implemented on the networking layer with a cache memory. In such an exemplary implementation, a controller may communicate with virtual network elements associated with each of the various services employed in a microservices architecture to obtain real-time traffic and computing information associated with each of the services. The real-time traffic and computing information, as well as historical traffic prediction information, may be provided to one or more trained machine learning models to determine a traffic prediction. The controller may, based on the traffic prediction generated by the trained machine learning model, determine flow and retry rules for each of the various services, and may communicate with the cache memory to enforce the flow and retry rules for the various services.

According to yet another aspect of the present disclosure, embodiments of the present disclosure may be implemented such that the various services that make up the application may query/poll/gossip with each other to obtain real-time traffic and computing information associated with each of the services. The real-time traffic and computing information, as well as historical traffic prediction information, may be provided to one or more trained machine learning models to determine a traffic prediction. The traffic prediction may be utilized by each of the service in making calls to one or more upstream services.

FIG. 1A is an illustration of an exemplary computing environment 100, according to exemplary embodiments of the present disclosure.

As shown in FIG. 1A, computing environment 100 may include one or more client devices 102, 104, and/or 106, also referred to as user devices, for connecting over network 108 to access an online application executing on remote computing resources 110. Remote computing resource(s) 110, and each of the other computing resources discussed herein, do not require end-user knowledge of the physical premises and configuration of the system that delivers the services. Common expressions associated with these remote computing resource(s) 110 include "on-demand computing," "software as a service (SaaS)," "platform computing," "network-accessible platform," "cloud services," "data centers," and so forth. Example components of a server that may be or be included in computing resources 110 is discussed below with respect to FIG. 5.

Client devices 102, 104, 106 and/or remote computing resources 110 may communicate via wired and/or wireless connections to network 108. Client devices 102, 104, and/or 106 may include any type of computing device, such as a smartphone, tablet, laptop computer, desktop computer, wearable, etc., and network 108 may include any wired or wireless network (e.g., the Internet, cellular, satellite, Bluetooth, Wi-Fi, etc.) that can facilitate communications between client devices 102. 104, and/or 106 and the online application executing on remote computing resources 110.

The online application executing on remote computing resources 110 may include one or more applications that may be implemented using a micro-services architecture (e.g., networked e-commerce platform, social media platform, advertising platform, etc.). Accordingly, the online application executing on remote computing resources 110 may be implemented using a micro-service architecture such that it includes a collection of independent services where each service performs an application process as a service. Upon execution of the online application executing on remote computing resources 110, calls may be placed (e.g., via an API) to the various components such that each of the various services may perform a respective application process. Further, the various services may be configured such that certain services may have dependencies to one or more other upstream services. Accordingly, the services may place calls (e.g., via an API) to the upstream services on which they depend.

According to exemplary embodiments of the present disclosure, the traffic being handled by the various services in connection with the online application executing on remote computing resources 110 may be monitored and managed by a traffic management service so that certain settings, parameters, and/or configurations (e.g., traffic rules) may be determined to manage the traffic handled by the services that make up the online application. For example, real-time traffic information, real-time computing information, and historical traffic information may be processed by one or more trained machine learning models of the traffic management service to generate a traffic prediction. Based on the traffic prediction, traffic and/or retry rules/configurations may be determined to dynamically manage the traffic among and between the various services. Accordingly, the rate at which calls are made to one or more upstream services can be managed based on the traffic and/or retry rules/configurations determined based on the real-time traffic information, real-time computing information, and historical traffic information. This can advantageously dynamically increase the capacity of transactions handled by the various components and mitigate failures in response to calls made by the various components.

According to an exemplary implementation, historical information 114 may be stored and maintained in one or more data store(s) 112 and may include historical traffic information and/or historical traffic prediction information. According to certain aspects, historical traffic prediction information may be determined (e.g., using a trained machine learning model) based on historical traffic information and may correspond to certain time periods (e.g., specific dates, specific weeks of the year, specific holidays (e.g., Black Friday, Cyber Monday, New Year's Day, etc.), specific months, specific time periods (e.g., morning, afternoon, evening, overnight, etc.), specific seasons, and the like). Further, the historical traffic predictions may be periodically updated as more recent historical traffic information becomes available.

Figure 1B:
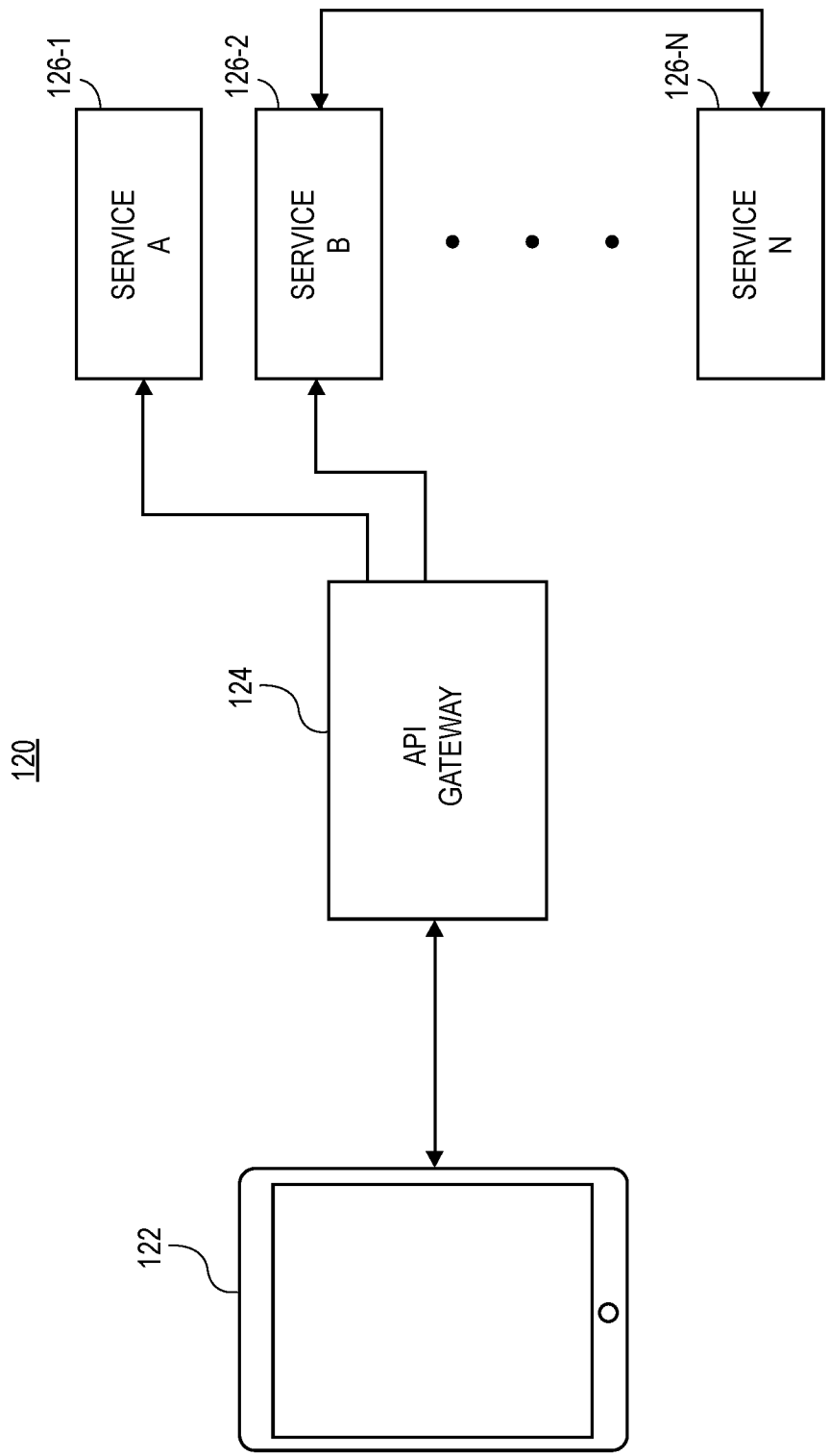
FIG. 1B is a block diagram of an exemplary computing environment, according to exemplary embodiments of the present disclosure.

FIG. 1B is a block diagram illustrating an exemplary computing environment 120, according to exemplary embodiments of the present disclosure.

FIG. 1B illustrates an exemplary implementation showing exemplary computing environment 120 where client device 122 may execute an application employing a microservices architecture (e.g., the online application executing on remote computing resources 110), according to exemplary embodiments of the present disclosure. Rather than accessing services 126 directly, client device 122 may access services 126-1, 126-2, through 126-N via API gateway 124. For example, client device 122 may initiate a call to API gateway 124, which may initiate calls to the appropriate services. As illustrated in FIG. 1B, client device 122 may initiate a call to API gateway 124, which may initiate calls to Service A 126-1 and Service B 126-2. Additionally, Service B 126-2 may have an upstream dependency on upstream Service N 126-N. Accordingly, Service B 126-2 may initiate a call (e.g., via an API) to Service N 126-N. Although FIG. 1B illustrates a simplified implementation where only Service B 126-2 has an upstream dependency to Service N 126-N, the microservice architecture may include any number of services, upstream dependencies, etc.

In the implementation illustrated in FIG. 1B, as calls are made to each service 126, traffic and retry rules and configurations may be enforced to ensure that none of services 126 are overloaded. The traffic rules and configurations may establish maximum transactions per second (TPS) that may be handled by each respective service 126. Accordingly, calls to one or more of services 126 that exceed the traffic rules and configurations being enforced may result in a failure in response to the call, and the retry rules and configurations may be utilized to attempt the call again to the respective service.

According to exemplary embodiments of the present disclosure, the traffic and retry rules and configurations may be determined based on real-time traffic information, real-time computing information, and historical traffic information associated with each of services 126. For example, real-time traffic information, real-time computing information, and historical traffic information may be provided as inputs to one or more trained machine learning models, which may generate a traffic prediction based on the real-time traffic information, real-time computing information, and historical traffic information. Based on the traffic prediction generated by the trained machine learning model, traffic and/or retry rules and configurations may be determined and established for each of services 126. The traffic and/or retry rules and configurations may then be enforced for each of services 126. Exemplary implementations are described in further detail herein in connection with FIGS. 2A-2E and 4.

FIGS. 2A-2E are block diagrams illustrating exemplary traffic management services 200, 220, 240, 260, and 280, according to exemplary embodiments of the present disclosure.

Figure 2A:
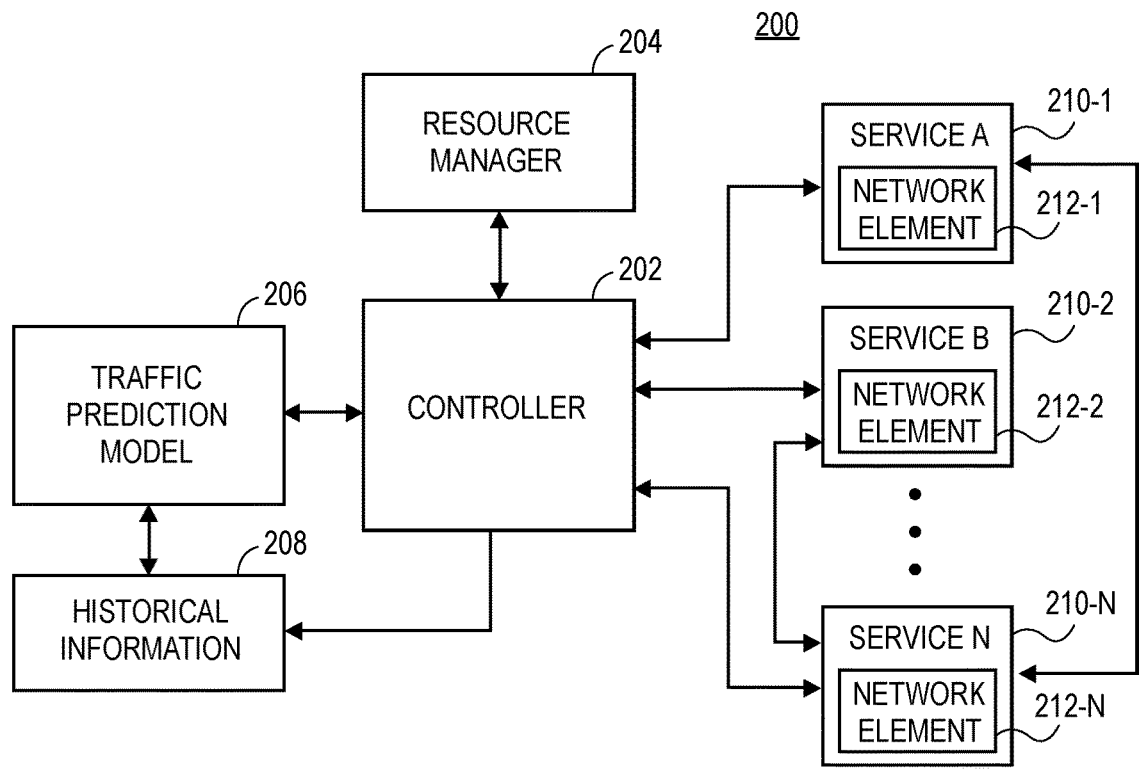
FIGS. 2A-2E are block diagrams of exemplary traffic management services, according to exemplary embodiments of the present disclosure.

As shown in FIG. 2A, exemplary traffic management service 200 may include controller 202, which may communicate with network elements 212 associated with services 210 of an application implemented using a microservices architecture to obtain real-time traffic information (e.g., from network elements 212) associated with services 210. Accordingly, services 210 may make up the collection of independent services that form the application and may each perform an application process. Additionally, controller 202 may also communicate with resource manager 204, traffic prediction model 206, and historical information datastore 208. According to certain aspects of the present disclosure, traffic management service 200 may be implemented on the network layer, and controller 202 may include a software defined network (SDN) controller.

Additionally, traffic prediction model 206 may communicate with historical information datastore 208. Historical information datastore 208 may be configured to store and maintain historical traffic information associated with services 210 and/or historical traffic prediction information associated with services 210. Historical traffic information may include actual traffic information (e.g., TPS, packets per second, etc.) for certain periods of time (e.g., specific dates, specific weeks of the year, specific holidays (e.g., Black Friday, Cyber Monday, New Year's Day, etc.), specific months, specific time periods (e.g., morning, afternoon, evening, overnight, etc.), specific seasons, and the like) and historical prediction information may include a traffic prediction for a specific period of time based on the historical traffic information. For example, at least a portion of the historical traffic information may be processed by a trained machine learning system (e.g., trained traffic prediction model 206 or another trained machine learning model) to generate traffic predictions for a period of time (e.g., a specific date, a specific week of the year, a specific holiday (e.g., Black Friday, Cyber Monday, New Year's Day, etc.), a specific month, a specific time period (e.g., morning, afternoon, evening, overnight, etc.), specific seasons, and the like) based on the historical traffic information. The historical prediction information may be periodically updated (e.g., reprocessed by the trained machine learning model) for one or more time periods as additional historical traffic information becomes available. For example, controller 202 may provide the real-time traffic information associated with services 210 that is obtained from network elements 212 to historical information datastore 208, which may be stored and maintained in historical information datastore 208 as additional historical traffic information. Accordingly, historical information datastore 208 may store and maintain historical traffic information associated with services 210 and/or historical traffic prediction information associated with services 210.

In operation, controller 202 may obtain real-time traffic information (e.g., TPS, packet per seconds, etc.) from network elements 212. Network elements 212 may include, for example, a virtual switch, virtual router, virtual bridge, virtual network interface card, and the like and can provide current real-time traffic information to controller 202. In exemplary implementations where traffic management service 200 is implemented in a virtual private cloud, network elements 212 may include elastic network interfaces (ENI) and traffic rules may be enforced by via the ENIs and/or virtual private cloud endpoints and/or endpoint interfaces. Additionally, controller 202 may also obtain real-time computing information associated with services 210 from resource manager 204. For example, controller 202 may obtain processor usage information, memory usage information, and the like from resource manager 204, which may monitor and obtain computing information from the various components on the network (e.g., all hosts, virtual machines, containers, etc.).

As shown in FIG. 2A, the real-time traffic information and the real-time computing information may be provided to traffic prediction model 206. Traffic prediction model may include one or more trained machine learning models that have been trained to generate traffic predictions based on historical traffic information for the relevant time period, real-time traffic information, and real-time computing information. Accordingly, traffic prediction model 206 may determine a traffic prediction based on historical traffic information obtained for the relevant time period from historical information datastore 208, as well as the real-time traffic information and the real-time computing information obtained from controller 202, and provide the traffic prediction to controller 202. The traffic prediction may include a predicted TPS for each service 210. Based on the traffic prediction generated by traffic prediction model 206, controller 202 may determine one or more traffic rules, which may specify metering flow limits, to enforce in connection with each service 210. Accordingly, the traffic rules may be continuously and dynamically updated based on real-time traffic and computing conditions experienced by services 210. For example, if it is determined that any service 210 is overloaded, this may be reflected in the real-time computing information (e.g., high processor and/or memory usage), which may produce a lower traffic prediction, thereby resulting in dynamic modification of the traffic rules to reduce traffic to the overloaded service. Conversely, if it is determined that any service 210 has excess capacity, an increased traffic prediction may be generated by traffic prediction model 206, thereby resulting in dynamic modification of the traffic rules to increase traffic to the services having excess capacity.

According to certain aspects of the present disclosure, the metering flow limit of the traffic rule may correspond to the predicted TPS included in the traffic prediction. Alternatively and/or in addition, the metering flow limit of the traffic rule may include a value that corresponds to a rate that is lower or higher than the predicted TPS included in the traffic prediction. For example, the metering flow limit of the traffic rule may include a metering flow limit that corresponds to a rate that is lower or higher than the predicted TPS by a predetermined value. In determining the traffic rule, controller 202 may determine a correlation between TPS and a metering value (e.g., packets per second/number of packets in a transaction).

To enforce the traffic rules, controller 202 may program network elements 212 with the traffic rule to enforce the traffic flow to and between services 210. For example, controller 202 may program network elements 212 with the determined traffic rule so that network elements 212 may enforce the traffic rule determined by controller 202 by limiting and/or making calls in accordance with the traffic rules to ensure that services 210 are not overloaded. Based on the programming of network elements 212 with the traffic rules, when traffic exceeds the metering flow limit, network elements 212 may drop the excess packets to prevent the calls from reaching their respective services. Additionally, the traffic for upstream services may be controlled at each respective source service. For example, in the implementation illustrated in FIG. 2A, since Service A 210-1 and Service B 210-2 have upstream dependencies on Service N 210-N, in addition to enforcing the traffic rule at network element 212-N, which is associated with Service N 210-N, the traffic to Service N 210-N may be controlled by enforcing the traffic rules at network element 212-1, which is associated with Service A 210-1, and network element 212-2, which is associated with Service B 210-2. Accordingly, this can limit the number of calls each source service initiates to each upstream service to ensure that each upstream service is not overloaded.

Conversely, traffic may also be increased and/or prioritized at the source service based on the traffic prediction. In the exemplary implementation shown in FIG. 2A, if Service A 210-1 initiates fewer calls to Service N 210-N, thereby resulting in excess capacity for Service N 210-N, traffic may be increased at Service B 210-2 to consume the excess capacity of Service N 210-N. Subsequently, if the calls initiated by Service A 210-1 increases, an assured forwarding scheme may be applied, whereby the excess traffic from Service B 210-2 may be dropped. Accordingly, embodiments of the present disclosure facilitate continuous and dynamic management of traffic to and between services 210 utilized in a microservices architecture based on real-time traffic and computing conditions experienced by services 210.

Optionally, traffic management service 200 may also include a distributed cache, which may be in communication with controller 202 and network elements 212. In such a configuration, controller 202 may continue to obtain the real-time traffic information from network elements 212, which may then be processed, along with real-time computing information (e.g., obtained form resource manager 204) and historical traffic information for the relevant time period (e.g., obtained from historical information datastore 208), to determine a traffic prediction (e.g., by traffic prediction model 206). Similarly, the traffic prediction may be used to determine one or more traffic rules, which may specify metering flow limits, to enforce in connection with each service 210. However, rather that program network elements directly, the traffic rules may be written to the distributed cache. Accordingly, to enforce the traffic rules, services 210 may periodically pull the traffic rules from the cache, and limit and/or make calls in accordance with the traffic rules to ensure that services 210 are not overloaded. Optionally, the traffic rules may also be directly programmed onto network elements 212.

Figure 2B:
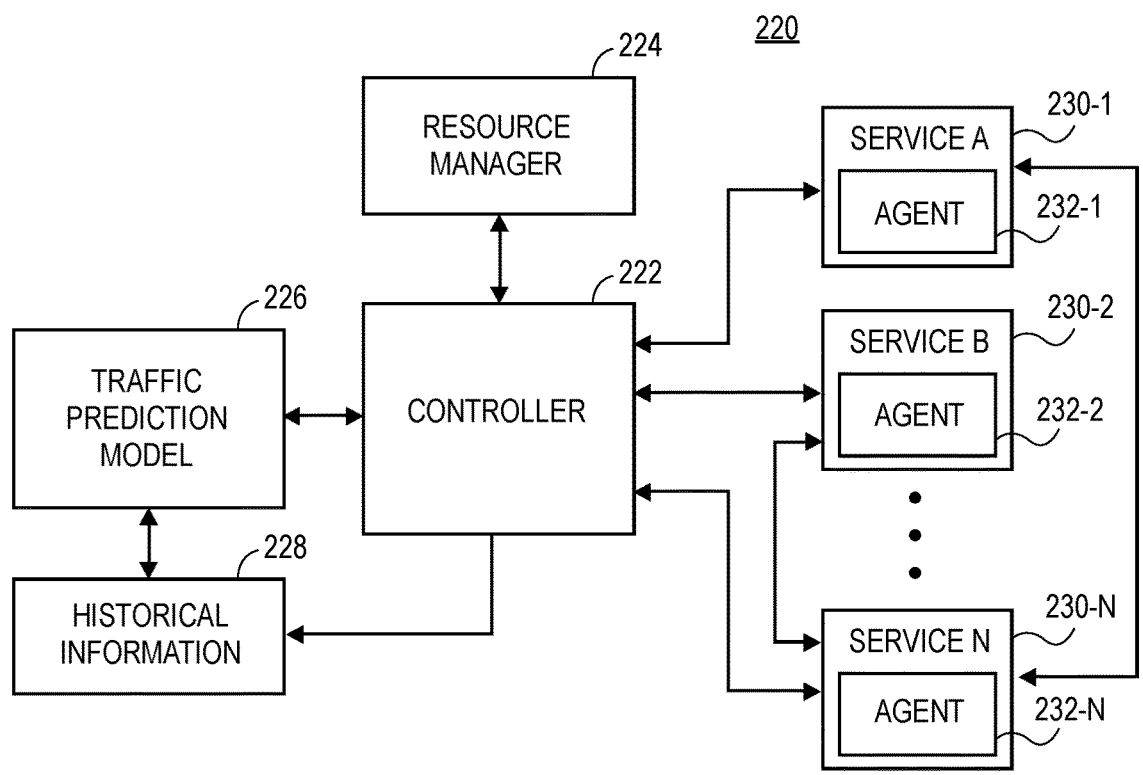

FIG. 2B illustrates exemplary traffic management service 220, according to exemplary embodiments of the present disclosure. Exemplary traffic management service 220 may be similar to traffic management service 200 shown in FIG. 2A, however, exemplary traffic management service 220 may be implemented on the application layer. Accordingly, controller 222 may include an application controller rather than an SDN controller and may communicate with agents 232 associated with services 230 rather than network elements associated with each respective service.

As shown in FIG. 2B, exemplary traffic management service 200 may include controller 222, which may communicate with agents 232 associated with services 230 of an application implemented using a microservices architecture to obtain real-time traffic information (e.g., from agents 232) associated with services 230. Accordingly, services 230 may make up the collection of independent services that form the application and may each perform an application process. Additionally, controller 222 may communicate with resource manager 224, traffic prediction model 226, and historical information datastore 228.

Additionally, traffic prediction model 226 may communicate with historical information datastore 228. Historical information datastore 228 may be configured to store and maintain historical traffic information associated with services 230 and/or historical traffic prediction information associated with services 230. Historical traffic information may include actual traffic information (e.g., TPS, packets per second, etc.) for certain periods of time (e.g., specific dates, specific weeks of the year, specific holidays (e.g., Black Friday, Cyber Monday, New Year's Day, etc.), specific months, specific time periods (e.g., morning, afternoon, evening, overnight, etc.), specific seasons, and the like) and historical prediction information may include a traffic prediction for a specific period of time based on the historical traffic information. For example, at least a portion of the historical traffic information may be processed by a trained machine learning system (e.g., trained traffic prediction model 226 or another trained machine learning model) to generate traffic predictions for a period of time (e.g., a specific date, a specific week of the year, a specific holiday (e.g., Black Friday, Cyber Monday, New Year's Day, etc.), a specific month, a specific time period (e.g., morning, afternoon, evening, overnight, etc.), specific seasons, and the like) based on the historical traffic information. The historical prediction information may be periodically updated (e.g., reprocessed by the trained machine learning model) for one or more time periods as additional historical traffic information becomes available. For example, controller 222 may provide the real-time traffic information associated with services 230 that is obtained from agents 232 to historical information datastore 228, which may be stored and maintained in historical information datastore 228 as additional historical traffic information. Accordingly, historical information datastore 228 may store and maintain historical traffic information associated with services 230 and/or historical traffic prediction information associated with services 230.

In operation, controller 222 may obtain real-time traffic information (e.g., TPS, packet per seconds, etc.) from agents 232, which may be associated with a respective service 230. For example, the real-time traffic information obtained by controller 222 may be in the form of a periodic "heartbeat" signal from each agent 232, which may include information such as the number of calls made to each respective service during a specified period of time. Additionally, controller 222 may also obtain real-time computing information associated with services 230 from resource manager 224. For example, controller 222 may obtain processor usage information, memory usage information, and the like from resource manager 224, which may monitor and obtain computing information from the various components on the network (e.g., all hosts, virtual machines, containers, etc.).

As shown in FIG. 2B, the real-time traffic information and the real-time computing information may be provided to traffic prediction model 226. Traffic prediction model 226 may include one or more trained machine learning models that have been trained to generate traffic predictions based on historical traffic information for the relevant time period, real-time traffic information, and real-time computing information. Accordingly, traffic prediction model 226 may determine a traffic prediction based on historical traffic information for the relevant time period obtained from historical information datastore 228, as well as the real-time traffic information and the real-time computing information obtained from controller 222, and provide the traffic prediction to controller 222. The traffic prediction may include a predicted TPS for each service 230. Based on the traffic prediction generated by traffic prediction model 226, controller 222 may determine one or more traffic rules, which may specify metering flow limits, to enforce in connection with each service 230. Accordingly, the traffic rules may be continuously and dynamically updated based on real-time traffic and computing conditions experienced by services 230. For example, if it is determined that any service 230 is overloaded, this may be reflected in the real-time computing information (e.g., high processor and/or memory usage), which may produce a lower traffic prediction, thereby resulting in dynamic modification of the traffic rules to reduce traffic to the overloaded service. Conversely, if it is determined that any service 230 has excess capacity, an increased traffic prediction may be generated by traffic prediction model 226, thereby resulting in dynamic modification of the traffic rules to increase traffic to the services having excess capacity.

According to certain aspects of the present disclosure, the metering flow limit of the traffic rule may correspond to the predicted TPS included in the traffic prediction. Alternatively and/or in addition, the metering flow limit of the traffic rule may include a value that corresponds to a rate that is lower or higher than the predicted TPS included in the traffic prediction. For example, the metering flow limit of the traffic rule may include a metering flow limit that corresponds to a rate that is lower or higher than the predicted TPS by a predetermined value. In determining the traffic rule, controller 222 may determine a correlation between TPS and a metering value (e.g., packets per second/number of packets in a transaction).

To enforce the traffic rules, controller 222 may program agents 232 with the traffic rule to enforce the traffic flow to and between services 230. For example, controller 222 may program agents 232 with the determined traffic rule so that agents 232 may enforce the traffic rule determined by controller 222 by limiting and/or making calls in accordance with the traffic rules to ensure that services 230 are not overloaded. Based on the programming of agents 232 with the traffic rules, agents 232 can limit the number of calls made to each respective service 230. Additionally, the traffic for upstream services may be controlled at each respective source service. For example, in the implementation illustrated in FIG. 2B, since Service A 230-1 and Service B 230-2 have upstream dependencies on Service N 230-N, in addition to enforcing the traffic rule at agent 232-N, which is associated with Service N 230-N, the traffic to Service N 230-N may be controlled by enforcing the traffic rules at agent 232-1, which is associated with Service A 230-1, and agent 232-2, which is associated with Service B 230-2. Accordingly, this can limit the number of calls each source service initiates to each upstream service to ensure that each upstream service is not overloaded.

Conversely, traffic may also be increased and/or prioritized at the source service based on the traffic prediction. In the exemplary implementation shown in FIG. 2B, if Service A 230-1 initiates fewer calls to Service N 230-N, thereby resulting in excess capacity for Service N 230-N, traffic may be increased at Service B 230-2 to consume the excess capacity of Service N 230-N. Subsequently, if the calls initiated by Service A 230-1 increases, an assured forwarding scheme may be applied, whereby the excess traffic from Service B 230-2 may be dropped. Accordingly, embodiments of the present disclosure facilitate continuous and dynamic management of traffic to and between services 230 utilized in a microservices architecture based on real-time traffic and computing conditions experienced by services 230.

Figure 2C:
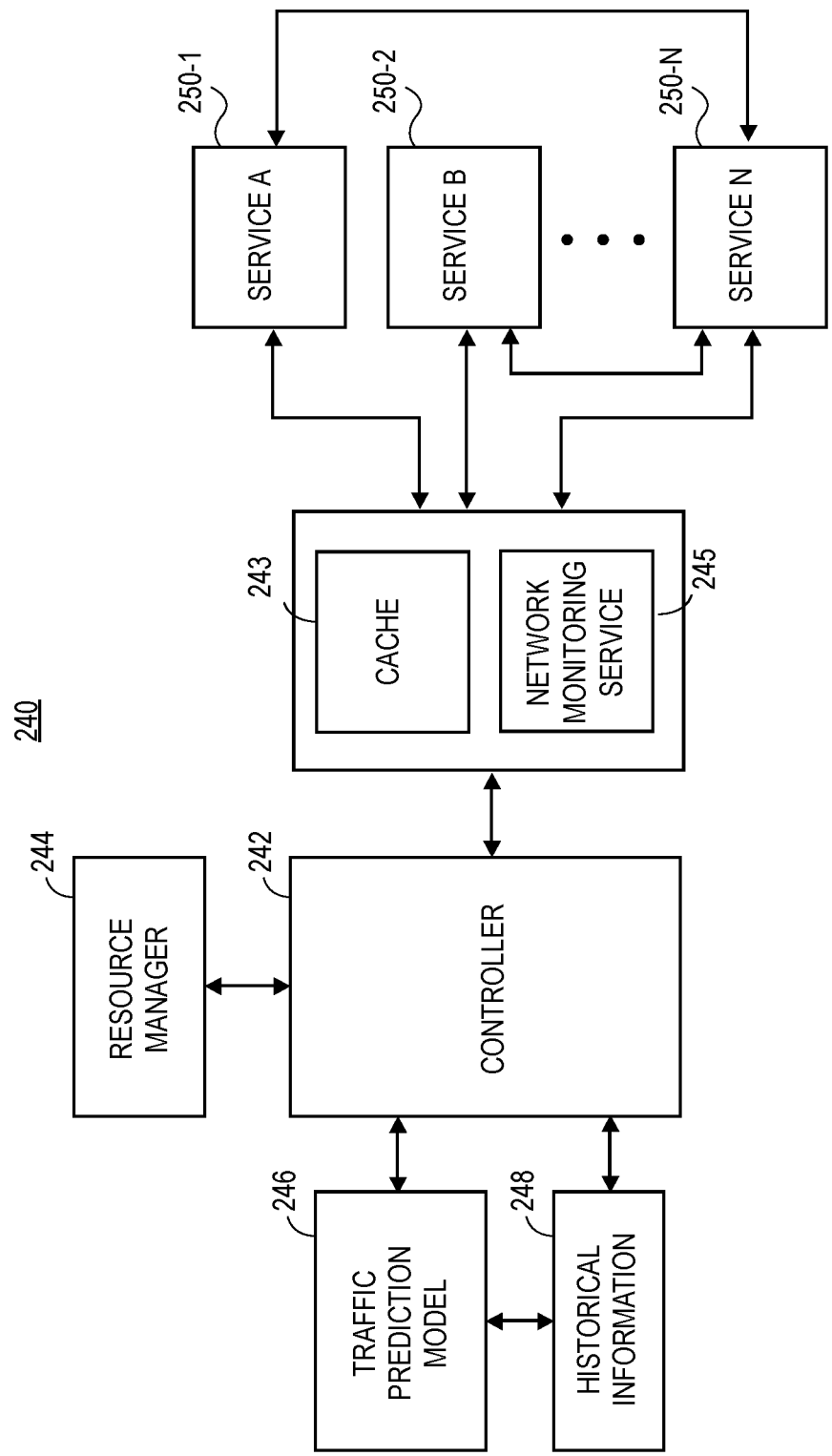

FIG. 2C illustrates exemplary traffic management service 240, according to exemplary embodiments of the present disclosure. Exemplary traffic management service 240 may be similar to traffic management service 200 and 220 shown in FIGS. 2A and 2B. However, as shown in FIG. 2C exemplary traffic management service 240 may employ cache memory 243 (e.g., a distributed cache) and network monitoring service 245. According to aspect of the present disclosure, traffic management service 240 may be implemented on either the application layer or on the network layer. In an exemplary implementation where traffic management service 240 is implemented on the application layer, controller 242 may include an application controller and may communicate with cache memory 243 and network monitoring service 245, both of which may communicate with services 250.

As shown in FIG. 2C, exemplary traffic management service 240 may include controller 242, which may communicate with cache 243 and network monitoring service 245, both of which may communicate with services 250 of an application implemented using a microservices architecture. According to certain exemplary implementations, controller 242 may obtain real-time traffic information associated with services 250 from network monitoring service 245. Accordingly, services 250 may make up the collection of independent services that form the application and may each perform an application process. Additionally, controller 242 may communicate with resource manager 244, traffic prediction model 246, and historical information datastore 248. Traffic prediction model 246 may also communicate with historical information datastore 248. Historical information datastore 248 may be configured to store and maintain historical traffic information associated with services 250 and/or historical traffic prediction information associated with services 250. Historical traffic information may include actual traffic information (e.g., TPS, packets per second, etc.) for certain periods of time (e.g., specific dates, specific weeks of the year, specific holidays (e.g., Black Friday, Cyber Monday, New Year's Day, etc.), specific months, specific time periods (e.g., morning, afternoon, evening, overnight, etc.), specific seasons, and the like) and historical prediction information may include a traffic prediction for a specific period of time based on the historical traffic information. For example, at least a portion of the historical traffic information may be processed by a trained machine learning system (e.g., trained traffic prediction model 246 or another trained machine learning model) to generate traffic predictions for a period of time (e.g., a specific date, a specific week of the year, a specific holiday (e.g., Black Friday, Cyber Monday, New Year's Day, etc.), a specific month, a specific time period (e.g., morning, afternoon, evening, overnight, etc.), specific seasons, and the like) based on the historical traffic information. The historical prediction information may be periodically updated (e.g., reprocessed by the trained machine learning model) for one or more time periods as additional historical traffic information becomes available. For example, controller 242 may provide the real-time traffic information associated with services 250 that is obtained from network monitoring service 245 to historical information datastore 248, which may be stored and maintained in historical information datastore 248 as additional historical traffic information. Accordingly, historical information datastore 248 may store and maintain historical traffic information associated with services 250 and/or historical traffic prediction information associated with services 250.

In operation, controller 242 may obtain real-time traffic information (e.g., TPS, packet per seconds, etc.) from logs maintained by network monitoring service 245, which may communicate with services 250. For example, services 250 may periodically provide real-time traffic information to network monitoring service 245. The real-time traffic information may include information such as TPS, the number of calls made to each respective service during a specified period of time, and the like. Additionally, controller 242 may also obtain real-time computing information associated with services 250 from resource manager 244. For example, controller 242 may obtain processor usage information, memory usage information, and the like from resource manager 244, which may monitor and obtain computing information from the various components on the network (e.g., all hosts, virtual machines, containers, etc.).

As shown in FIG. 2C, the real-time traffic information and the real-time computing information may be provided to traffic prediction model 246. Traffic prediction model may include one or more trained machine learning models that have been trained to generate traffic predictions based on historical traffic information for the relevant time period, real-time traffic information, and real-time computing information. Accordingly, traffic prediction model 246 may determine a traffic prediction based on historical traffic for the relevant time period, information obtained from historical information datastore 248, as well as the real-time traffic information and the real-time computing information obtained from controller 242, and provide the traffic prediction to controller 242. The traffic prediction may include a predicted TPS for each service 250. Based on the traffic prediction generated by traffic prediction model 246, controller 242 may determine one or more traffic rules, which may specify metering flow limits, to enforce in connection with each service 250. Accordingly, the traffic rules may be continuously and dynamically updated based on real-time traffic and computing conditions experienced by services 250. For example, if it is determined that any service 250 is overloaded, this may be reflected in the real-time computing information (e.g., high processor and/or memory usage), which may produce a lower traffic prediction, thereby resulting in dynamic modification of the traffic rules to reduce traffic to the overloaded service. Conversely, if it is determined that any service 250 has excess capacity, an increased traffic prediction may be generated by traffic prediction model 246, thereby resulting in dynamic modification of the traffic rules to increase traffic to the services having excess capacity.

According to certain aspects of the present disclosure, the metering flow limit of the traffic rule may correspond to the predicted TPS included in the traffic prediction. Alternatively and/or in addition, the metering flow limit of the traffic rule may include a value that corresponds to a rate that is lower or higher than the predicted TPS included in the traffic prediction. For example, the metering flow limit of the traffic rule may include a metering flow limit that corresponds to a rate that is lower or higher than the predicted TPS by a predetermined value. In determining the traffic rule, controller 242 may determine a correlation between TPS and a metering value (e.g., packets per second/number of packets in a transaction).

To enforce the traffic rules, controller 242 may write the traffic rules to cache 243. Services 250 may periodically pull the traffic rules from cache 243 and make calls in accordance with the traffic rules to enforce the traffic flow to and between services 250. For example, controller 242 may program cache 243 with the determined traffic rule so that services 250 are not overloaded. Based on the programming of cache 243 with the traffic rules, the number of calls made to each respective service 250 can be limited in accordance with the traffic rules. Additionally, the traffic for upstream services may be controlled at each respective source service. For example, in the implementation illustrated in FIG. 2C, since Service A 250-1 and Service B 250-2 have upstream dependencies on Service N 250-N, the traffic to Service N 250-N may be controlled by limiting the number of calls that Service A 250-1 and Service B 250-2 may make to Service N 250-N. Accordingly, this can limit the number of calls each source service initiates to each upstream service to ensure that each upstream service is not overloaded.

Conversely, traffic may also be increased and/or prioritized at the source service based on the traffic prediction. In the exemplary implementation shown in FIG. 2C, if Service A 250-1 initiates fewer calls to Service N 250-N, thereby resulting in excess capacity for Service N 250-N, traffic may be increased at Service B 250-2 to consume the excess capacity of Service N 250-N. Subsequently, if the calls initiated by Service A 250-1 increases, an assured forwarding scheme may be applied, whereby the excess traffic from Service B 250-2 may be dropped. Accordingly, embodiments of the present disclosure facilitate continuous and dynamic management of traffic to and between services 250 utilized in a microservices architecture based on real-time traffic and computing conditions experienced by services 250.

Figure 2D:
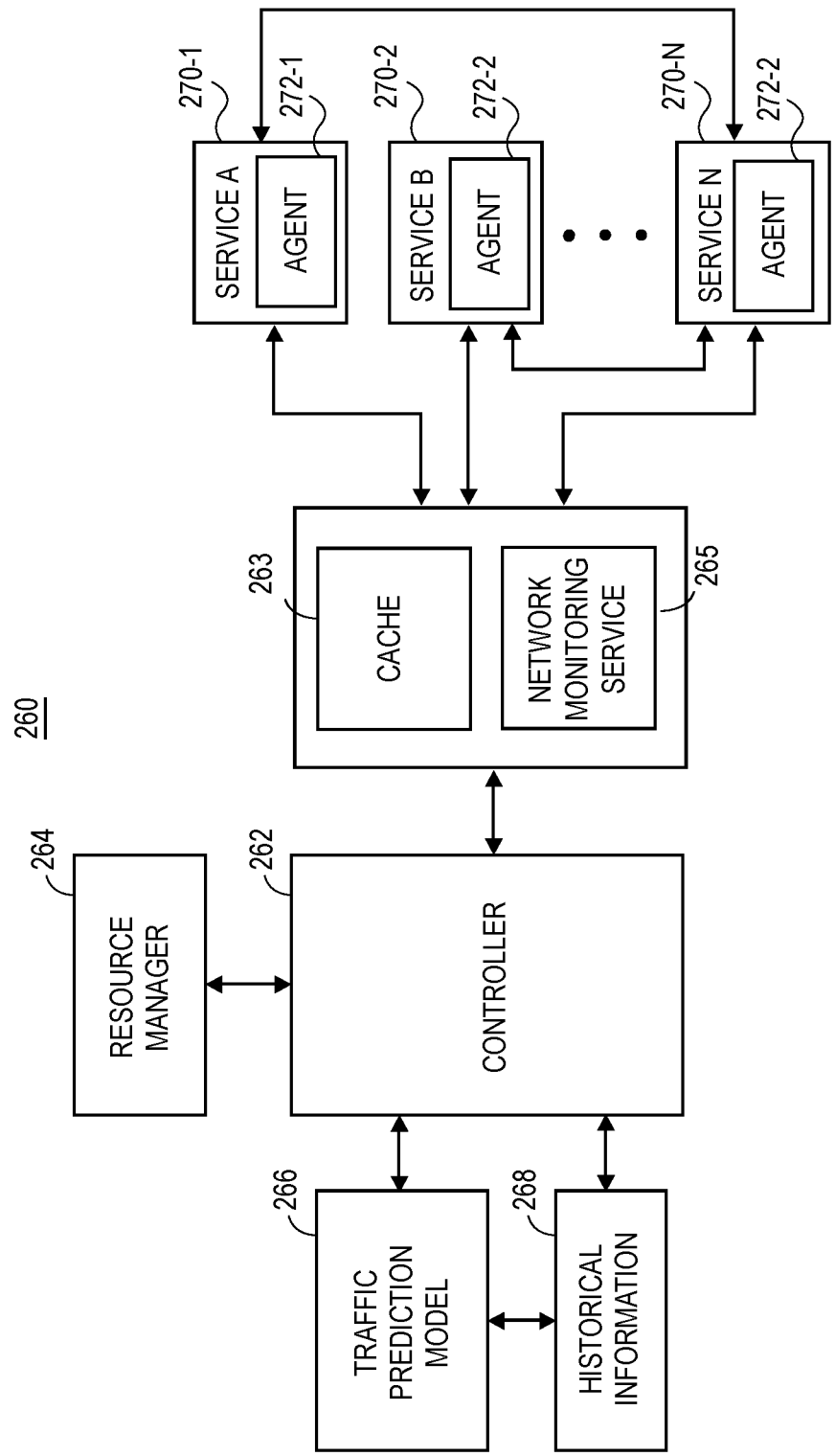

FIG. 2D illustrates exemplary traffic management service 260, according to exemplary embodiments of the present disclosure. Exemplary traffic management service 260 may be substantially similar to traffic management service 240 shown in FIG. 2C. However, as shown in FIG. 2D and similar to traffic management service 220 shown in FIG. 2B, each service 270-1, 270-2, and 270-N may include an associated agent 272-1, 272-2, and 272-N. Accordingly, in operation, traffic management service 260 may incorporate functionality described in connection with traffic management services 220 and/or 240. For example, in the exemplary implementation illustrated in FIG. 2D, the real-time traffic information may be obtained from agents 272 via a periodic "heartbeat" signal. Similar to other described implementations, the real-time traffic information may be used, along with historical traffic information for the relevant time period (e.g., from historical information datastore 268) and real-time computing information (e.g., from resource manager 264), to generate (e.g., by traffic prediction model 266) a traffic prediction, which may be used to determine one or more traffic rules. Similar to traffic management service 240 shown in FIG. 2C, the traffic rules may be written to cache 263 (e.g., a distributed cache), which may be periodically pulled by services 270 so that calls can be made in accordance with the traffic rules to enforce the traffic rules. Further, the traffic rules may be continuously and dynamically updated in view of the real-traffic and computing information. Additionally, controller 262 may provide the real-time traffic information associated with services 270 that is obtained from agents 272 to historical information datastore 268, which may be stored and maintained in historical information datastore 268 as additional historical traffic information.

Alternatively and/or in addition, similar to the traffic management service 240, real-time traffic information may be obtained from network monitoring service 265. The real-time traffic information may be used, along with historical traffic information for the relevant time period (e.g., from historical information datastore 268) and real-time computing information (e.g., from resource manager 264), to generate (e.g., by traffic prediction model 266) a traffic prediction, which may be used to determine one or more traffic rules. Similar to traffic management service 220 shown in FIG. 2B, agents 272 may be programmed with the traffic rules, which may manage calls initiated by services 270 in accordance with the traffic rules to enforce the traffic rules. Further, the traffic rules may be continuously and dynamically updated in view of the real-traffic and computing information.

Figure 2E:
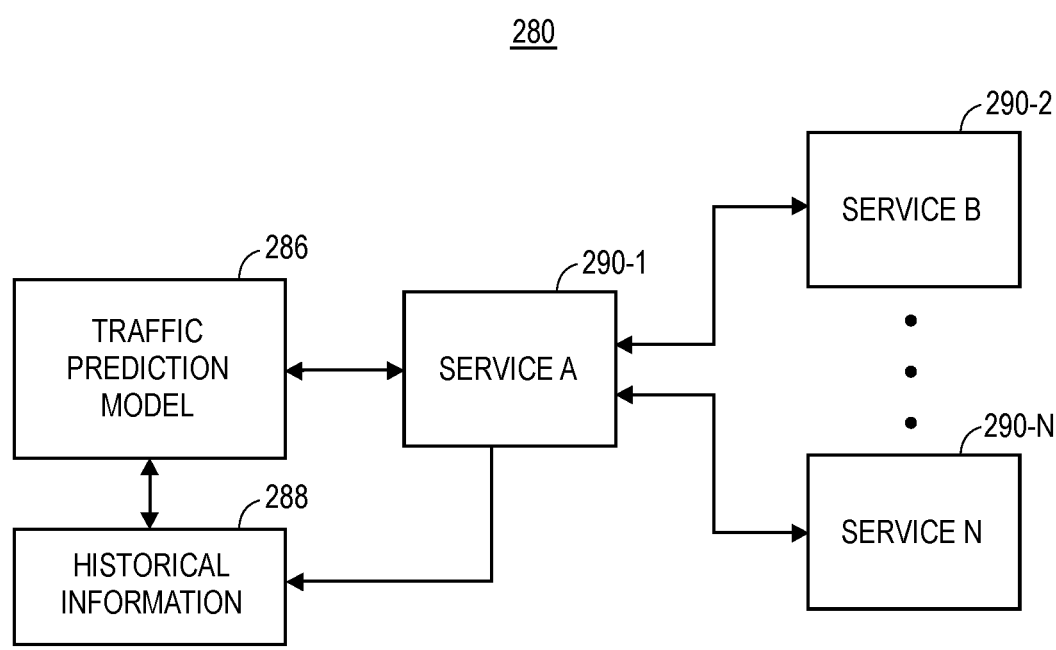

FIG. 2E illustrates exemplary traffic management service 280, according to exemplary embodiments of the present disclosure, where one or more of the services can provide the real-time traffic information and enforce the traffic rules. Preferably, exemplary traffic management service 280 may be implemented on the application layer.

As shown in FIG. 2E, Service A 290-1 may periodically query/poll/gossip with upstream dependency services (i.e., Service B 290-2 and Service N 290-N) to obtain real-time traffic and computing information. Service A 290-1 can then provide the real-time traffic and computing information directly to traffic prediction model 286. Similar to other described implementations, a traffic prediction may be generated by traffic prediction model 286 based on historical traffic information for the relevant time period (e.g., obtained from historical information datastore 288), and the real-time traffic and computing information obtained from Service A 290-1. The traffic prediction may be used to determine one or more traffic rules, which may be provided to Service A 290-1. Service A 290-1 may then initiate calls to upstream services (e.g., Service B 290-2 and Service N 290-N) in accordance with the traffic rules to enforce the traffic rules which were determined based on the real-time traffic and computing conditions. Accordingly, the traffic rules may be continuously and dynamically updated in view of the real-traffic and computing information. Additionally, service A 290-1 may provide the real-time traffic information associated with services 290 to historical information datastore 288, which may be stored and maintained in historical information datastore 288 as additional historical traffic information.

Alternatively and/or in addition, exemplary traffic management service 280 may be implemented on the networking layer. In an exemplary implementation, network elements (e.g., virtual switches, virtual network interface cards, etc.) associated with each service 290 may periodically query/poll/gossip with upstream dependency services (i.e., Service B 290-2 and Service N 290-N) to obtain real-time traffic and computing information. The network element associated with Service A 290-1 can then provide the real-time traffic and computing information directly to traffic prediction model 286. Similar to other described implementations, a traffic prediction may be generated by traffic prediction model 286 based on historical traffic information for the relevant time period (e.g., obtained from historical information datastore 288), and the real-time traffic and computing information obtained from the network element associated with Service A 290-1. The traffic prediction may be used to determine one or more traffic rules. The network element associated with Service A 290-1 may then manage traffic and initiate calls to upstream services (e.g., Service B 290-2 and Service N 290-N) in accordance with the traffic rules to enforce the traffic rules which were determined based on the real-time traffic and computing conditions. Accordingly, the traffic rules may be continuously and dynamically updated in view of the real-traffic and computing information.

Figure 3:
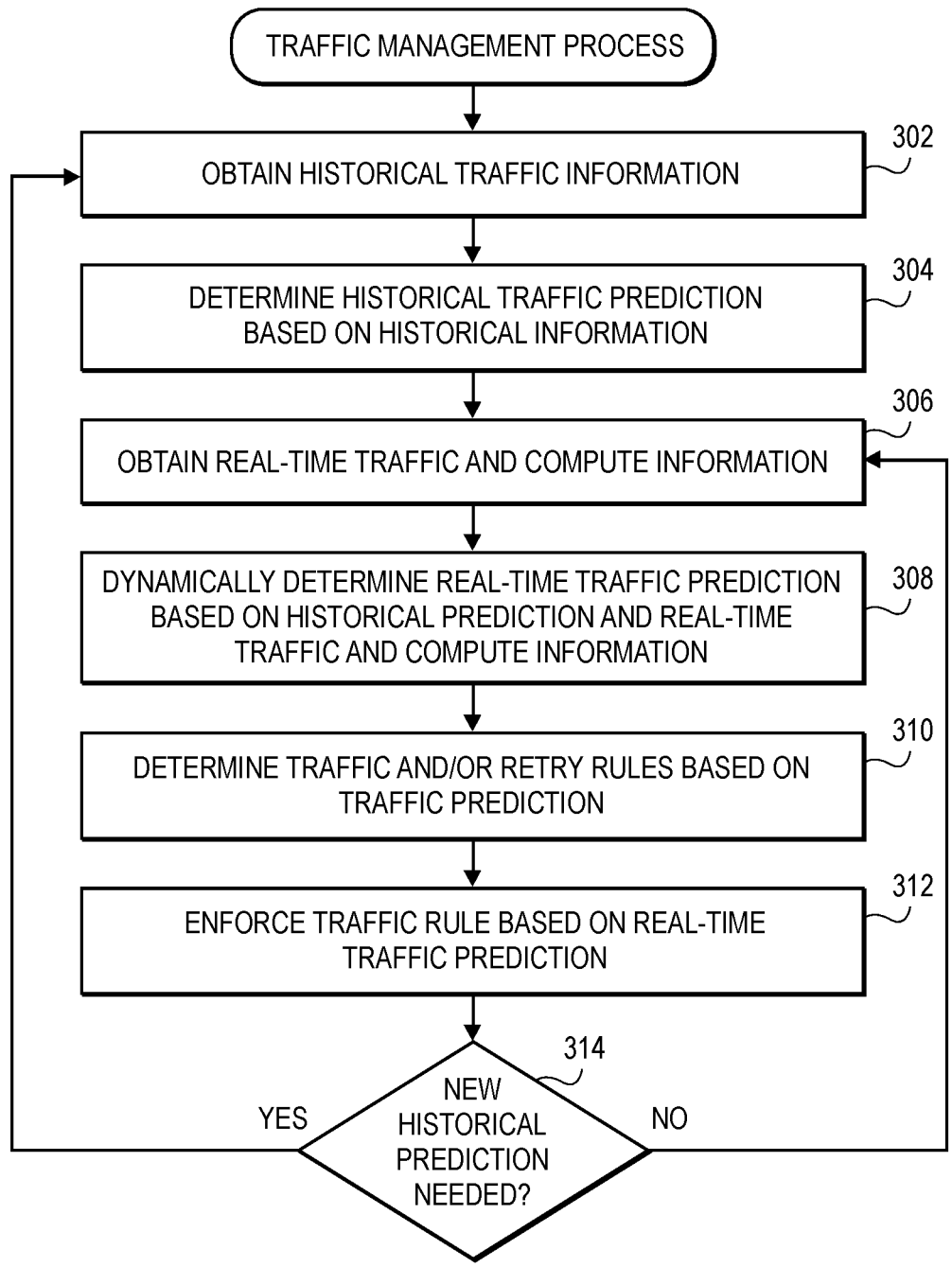
FIG. 3 is a flow diagram of an exemplary traffic management process, according to exemplary embodiments of the present disclosure.

FIG. 3 is a flow diagram of an exemplary traffic management process 300, according to exemplary embodiments of the present disclosure.

As shown in FIG. 3, process 300 may begin with obtaining historical traffic information for the relevant time period, as in step 302. The historical traffic information may include actual traffic information (e.g., TPS, packets per second, etc.) associated with certain services for certain periods of time (e.g., specific dates, specific weeks of the year, specific holidays (e.g., Black Friday, Cyber Monday, New Year's Day, etc.), specific months, specific time periods (e.g., morning, afternoon, evening, overnight, etc.), specific seasons, and the like). The historical traffic information may be processed (e.g., by a trained machine learning model) to determine historical traffic predictions associated with the services for a period of time (e.g., a specific date, a specific week of the year, a specific holiday (e.g., Black Friday, Cyber Monday, New Year's Day, etc.), a specific month, a specific time period (e.g., morning, afternoon, evening, overnight, etc.), specific seasons, and the like), as in step 304. According to certain exemplary embodiments, the historical traffic predictions may be determined in advance (e.g., in batch) and may be stored and maintained in a datastore where they may be accessed as needed. Further, the historical prediction information may be periodically updated (e.g., reprocessed by the trained machine learning model) for one or more time periods as additional historical traffic information becomes available.

In step 306, real-time traffic and computing information (e.g., TPS, packet per seconds, processor/CPU usage, memory usage, etc.) may be obtained (e.g., from network elements associated with services, agents associated with agents, a distributed cache, a network monitoring service, one or more services, a network resource management service, etc.). The historical traffic prediction for the relevant time period, real-time traffic information, and real-time computing information may be processed by a trained machine learning model to dynamically determine a real-time traffic prediction, as in step 308. The traffic prediction may include a predicted TPS for each service.

In step 310, one or more traffic and/or retry rules may be determined based on the traffic prediction. The traffic rules may specify metering flow limits, TPS, packets per second, etc. for each service. The determined traffic rules may then be enforced, as in step 312, to mitigate failures in response to calls made to services and/or ensure that services are not overloaded. For example, network elements (e.g., virtual switches, routers, network interface cards, elastic network interfaces, virtual private cloud endpoints, etc.) associated with the various services may be programmed with the traffic rules, and the network elements may manage the traffic in accordance with the traffic rules (e.g., dropping packets, limiting calls to upstream services, etc.) to enforce the traffic rules. Alternatively and/or in addition, agents associated with the various services may be programmed with the traffic rules, and the agents may manage the traffic in accordance with the traffic rules (e.g., dropping packets, limiting calls to upstream services, etc.) to enforce the traffic rules. According to yet another aspect, the traffic rules may be written to a distributed cache, and the various services may periodically pull the traffic rules to be enforced and may manage the traffic in accordance with the traffic rules (e.g., dropping packets, limiting calls to upstream services, etc.) to enforce the traffic rules. Further, any combination of the various configurations for enforcing the traffic rules may be employed. In step 314, it may be determined whether a new historical traffic prediction is needed. If a new historical traffic prediction is needed, process 300 returns to step 302, otherwise, process 300 may return to step 306.

Figure 4:
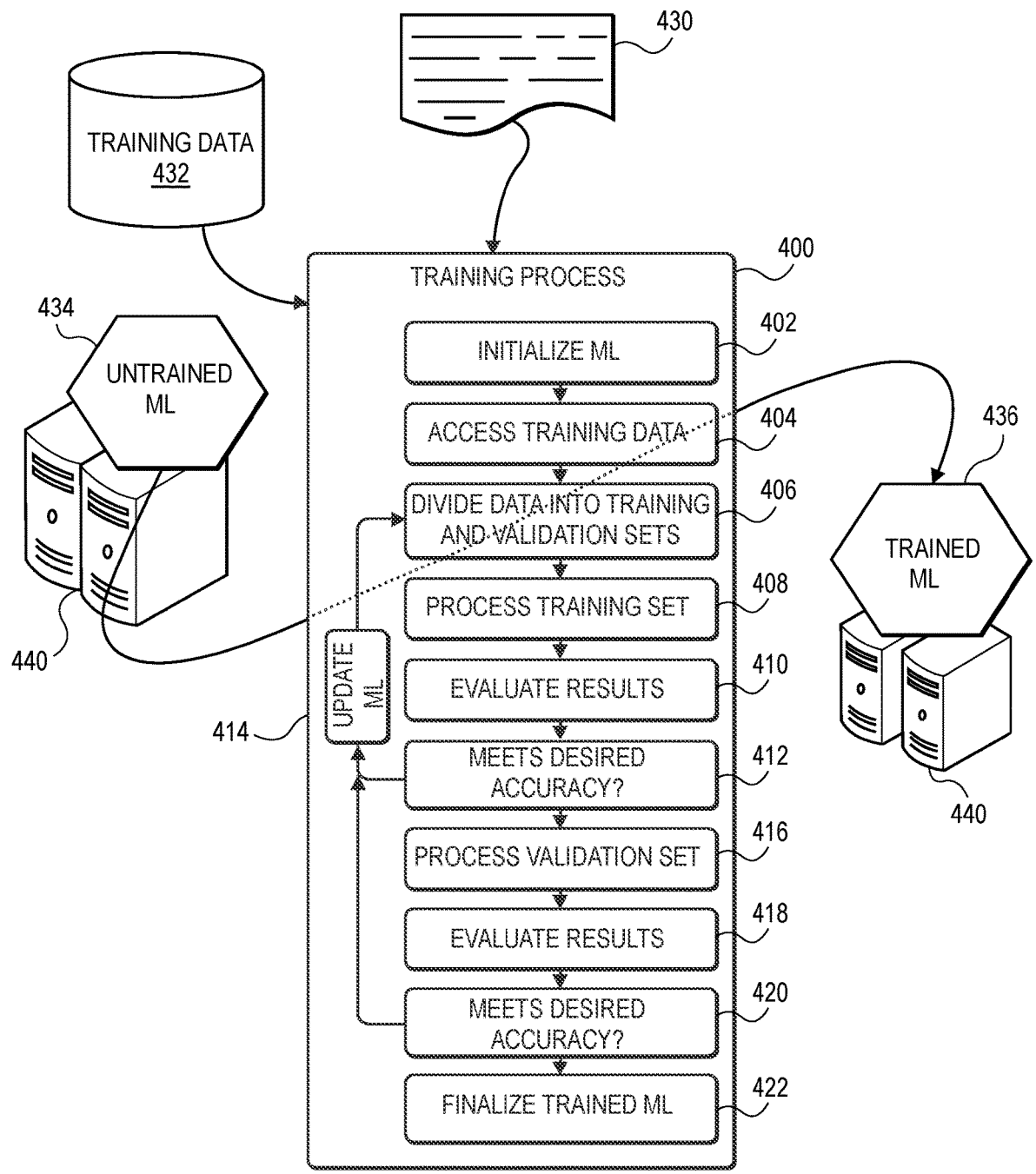
FIG. 4 is a flow diagram of an exemplary machine learning model training process, according to exemplary embodiments of the present disclosure.

FIG. 4 is a flow diagram of an exemplary training process 400 for training a machine learning model, according to exemplary embodiments of the present disclosure.

As shown in FIG. 4, training process 400 is configured to train an untrained machine learning model 434 operating on computer system 440 to transform untrained machine learning model 434 into trained machine learning model 436 that operates on the same or another computer system, such as remote computing resource 110. In the course of training, as shown in FIG. 4, at step 402, untrained machine learning model 434 is initialized with training criteria 430. Training criteria 430 may include, but is not limited to, information as to a type of training, number of layers to be trained, candidate labels, etc.

At step 404 of training process 400, corpus of training data 432 (e.g., labeled or unlabeled), may be accessed. For example, if training is to generate a trained machine learning model that predicts traffic flow, training data 432 may include actual traffic information associated with certain services, such as packets per second, transactions per second (TPS), and the like, for specific periods of time (e.g., specific dates, specific weeks of the year, specific holidays (e.g., Black Friday, Cyber Monday, New Year's Day, etc.), specific months, specific time periods (e.g., morning, afternoon, evening, overnight, etc.), specific seasons, and the like).

With training data 432 accessed, at step 406, training data 432 is divided into training and validation sets. Generally speaking, the items of data in the training set are used to train untrained machine learning model 434 and the items of data in the validation set are used to validate the training of the machine learning model. As those skilled in the art will appreciate, and as described below in regard to much of the remainder of training process 400, there are numerous iterations of training and validation that occur during the training of the machine learning model.

At step 408 of training process 400, the data items of the training set are processed, often in an iterative manner. Processing the data items of the training set includes capturing the processed results. After processing the items of the training set, at step 410, the aggregated results of processing the training set are evaluated, and at step 412, a determination is made as to whether a desired accuracy level has been achieved. If the desired accuracy level is not achieved, in step 414, aspects of the machine learning model are updated in an effort to guide the machine learning model to generate more accurate results, and processing returns to step 406, where a new set of training data is selected, and the process repeats. Alternatively, if the desired accuracy level is achieved, training process 400 advances to step 416.

At step 416, and much like step 408, the data items of the validation set are processed, and at step 418, the processing accuracy of this validation set is aggregated and evaluated. At step 420, a determination is made as to whether a desired accuracy level, in processing the validation set, has been achieved. If the desired accuracy level is not achieved, in step 414, aspects of the machine learning model are updated in an effort to guide the machine learning model to generate more accurate results, and processing returns to step 406. Alternatively, if the desired accuracy level is achieved, the training process 400 advances to step 422.

At step 422, a finalized, trained machine learning model 436 is generated. Typically, though not exclusively, as part of finalizing the now-trained machine learning model 436, portions of the machine learning model that are included in the model during training for training purposes are extracted, thereby generating a more efficient trained machine learning model 436.

Figure 5:
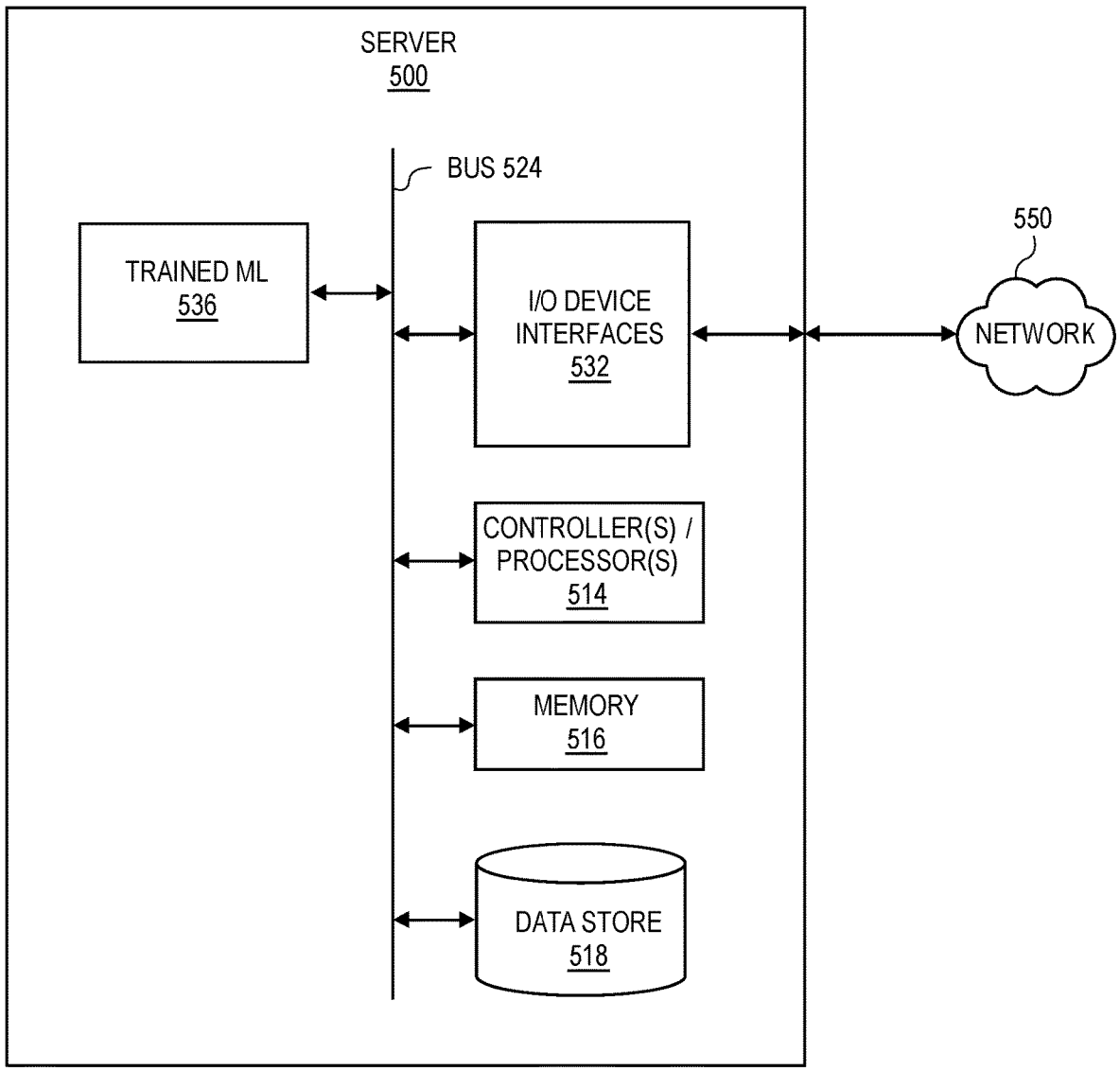
FIG. 5 is a block diagram of an exemplary server, according to exemplary embodiments of the present disclosure.

FIG. 5 is a block diagram conceptually illustrating example components of a remote computing device, such as remote server 500, that may include and/or execute one or more of the above discussed trained machine learning models, in accordance with described implementations. Multiple such servers 500 may be included in the system.

Each of server(s) 500 may include one or more controllers/processors 514, that may each include a central processing unit (CPU) for processing data and computer-readable instructions, and memory 516 for storing data and instructions. Memory 516 may individually include volatile random-access memory (RAM), non-volatile read only memory (ROM), non-volatile magnetoresistive (MRAM) and/or other types of memory. Each server may also include a data storage component 518, for storing data, controller/processor-executable instructions, training data, labels, etc. Each data storage component may individually include one or more non-volatile storage types such as magnetic storage, optical storage, solid-state storage, etc. Each server 500 may also be connected to removable or external non-volatile memory and/or storage (such as a removable memory card, memory key drive, networked storage, etc.), internal, and/or external networks 550 (e.g., the Internet) through respective input/output device interfaces 532.

Computer instructions for operating each server 500 and its various components may be executed by the respective server's controller(s)/processor(s) 514, using the memory 516 as temporary "working" storage at runtime. Server 500's computer instructions may be stored in a non-transitory manner in non-volatile memory 516, data storage 518, and/or an external device(s). Alternatively, some or all of the executable instructions may be embedded in hardware or firmware on the respective device in addition to or instead of software.

Each server 520 includes input/output device interfaces 532. A variety of components may be connected through the input/output device interfaces. Additionally, each server 500 may include address/data bus 524 for conveying data among components of the respective server. Each component within server 500 may also be directly connected to other components in addition to (or instead of) being connected to other components across bus 524. Each server 500 may also include one or more trained machine learning models 536, as discussed herein.

The components of the server(s) 500, as illustrated in FIG. 5, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 3 and 4, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:
1. A computer-implemented method, comprising:
   obtaining historical traffic information associated with a plurality of services that form an application implemented using a microservices architecture employing the plurality of services, wherein the plurality of ser- vices includes a first service of the plurality of services that is dependent on an upstream second service of the plurality of services;

determining, based at least in part on the historical traffic information, a historical traffic prediction for a period of time for the plurality of services;

obtaining, by a software defined network (SDN) controller, real-time traffic information associated with the plurality of services;

obtaining, by the SDN controller, real-time computing information associated with the plurality of services;

determining, using a trained machine learning model and based at least in part on the historical traffic prediction, the real-time traffic information, and the real-time computing information, a real-time traffic prediction associated with the plurality of services;

generating a plurality of traffic rules specifying a transactions per second (TPS) for at least a portion of the plurality of services based at least in part on the real-time traffic prediction, wherein the plurality of traffic rules includes a first traffic rule specifying a first TPS associated with the upstream second service; and enforcing the plurality of traffic rules for the plurality of services, wherein enforcing the first traffic rule includes controlling traffic from the first service to the upstream second service in accordance with the first traffic rule.

2. The computer-implemented method of claim 1, wherein the real-time traffic information is obtained from a plurality of virtual network devices associated with the plurality of services.

3. The computer-implemented method of claim 2, wherein the plurality of virtual network devices enforces the plurality of traffic rules for the plurality of services.

4. The computer-implemented method of claim 3, wherein:

the first service is associated with a first virtual network device from the plurality of virtual network devices; and enforcing the first traffic rule includes the first virtual network device being programmed with the first traffic rule to control the traffic from the first service to the upstream second service.

5. The computer-implemented method of claim 1, further comprising:

obtaining, by the SDN controller, second real-time traffic information associated with the plurality of services;

determining, based at least in part on the historical traffic prediction and the second real-time traffic information, a second real-time traffic prediction associated with the plurality of services;

generating an updated traffic rule specifying a second TPS based at least in part on the second real-time traffic prediction; and enforcing the updated traffic rule for the plurality of services.

6. A computing system, comprising:
one or more processors;
a memory storing program instructions that, when executed by the one or more processors, cause the one or more processors to at least:
determine, using a trained machine learning model, a real-time traffic prediction associated with a plurality of services, wherein:
the plurality of services implement an application using a microservices architecture;
the plurality of services includes a first service of the plurality of services that is dependent on an upstream second service of the plurality of services; and
the determination of the real-time traffic prediction is based at least in part on:
a historical traffic prediction associated with the plurality of services;
real-time traffic information associated with the plurality of services; and
real-time computing information associated with the plurality of services;

generate, based at least in part on the real-time traffic prediction, a first traffic rule associated with traffic between the first service and the upstream second service and specifying a first transactions per second (TPS) associated with the upstream second service; and dynamically manage traffic between at least some of the plurality of services, wherein dynamically managing the traffic includes managing second traffic from the first service to the upstream second service based at least in part on the first traffic rule.

7. The computing system of claim 6, wherein:
the real-time traffic information is obtained by a network layer controller from a plurality of virtual network elements associated with the plurality of services; and
dynamically managing the traffic between at least some of the plurality of services includes instructing the plurality of virtual network elements to manage the traffic in connection with at least one of the plurality of services based at least in part on the real-time traffic prediction.

8. The computing system of claim 7, wherein the plurality of virtual network elements includes at least one of:
a virtual network interface card;
a virtual switch;
an elastic network interface; or
a virtual private cloud endpoint.

9. The computing system of claim 6, wherein:
the real-time traffic information is obtained by an application layer controller from a plurality of agents associated with the plurality of services; and
managing the traffic in connection with at least one of the plurality of services includes instructing the plurality of agents to manage the traffic in connection with at least one of the plurality of services based at least in part on the real-time traffic prediction.

10. The computing system of claim 9, wherein the program instructions that when executed by the one or more processors, further cause the one or more processors to at least:
generate, by the plurality of agents, a periodic signal including the real-time traffic information; and
transmit the periodic signal to the application layer controller.

11. The computing system of claim 6, further comprising:
a distributed cache in communication with each of the plurality of services, and wherein:
the real-time traffic information is obtained by an application layer controller from a network monitoring service;
the real-time computing information is obtained by the application layer controller from a network resource management service; and
managing the traffic in connection with at least one of the plurality of services includes storing, in the distributed cache, traffic instructions, which are based at least in part on the real-time traffic prediction and are obtained by the plurality of services to manage the traffic in connection with at least one of the plurality of services.

12. The computing system of claim 6, further comprising:
a distributed cache in communication with each of the plurality of services, and wherein:
the real-time traffic information is obtained by a network layer controller from a plurality of virtual network elements associated with the plurality of services; and
managing the traffic in connection with at least one of the plurality of services includes storing, in the distributed cache, traffic instructions, which are based at least in part on the real-time traffic prediction and are obtained by the plurality of virtual network elements to manage the traffic in connection with at least one of the plurality of services.

13. The computing system of claim 6, wherein the program instructions that when executed by the one or more processors, further cause the one or more processors to at least:
cause the first service to periodically poll each of a second plurality of upstream services to obtain the real-time traffic information from the second plurality of upstream services.

14. The computing system of claim 6, wherein the real-time computing information is obtained from a network resource management service.

15. The computing system of claim 6, wherein obtaining the historical traffic prediction includes processing, by a trained machine learning model, a plurality of historical traffic information to generate the historical traffic prediction.

16. A computer-implemented method, comprising:
obtaining a historical traffic prediction for a plurality of services that form an application implemented using a microservices architecture employing the plurality of services, wherein the plurality of services includes a first service of the plurality of services that is dependent on an upstream second service of the plurality of services;
obtaining real-time traffic information associated with the plurality of services;
obtaining real-time computing information associated with the plurality of services;
processing, using a trained machine learning model, the historical traffic prediction, the real-time traffic information, and the real-time computing information to determine a real-time traffic prediction associated with the plurality of services;
generating a plurality of traffic rules specifying a transactions per second (TPS) for at least a portion of the plurality of services based at least in part on the real-time traffic prediction, wherein the plurality of traffic rules includes a first traffic rule specifying a first TPS associated with the upstream second service; and
enforcing the first traffic rule to manage traffic to and between the plurality of services, wherein enforcing the first traffic rule includes controlling traffic from the first service to the upstream second service in accordance with the first traffic rule.

17. The computer-implemented method of claim 16, wherein the plurality of traffic rules are continuously and dynamically updated as at least one of the real-time traffic information or the real-time computing information changes.

* * * * *